United States Patent Office 2,788,376
Patented Apr. 9, 1957

2,788,376
METHOD OF PREPARING TRIBROMOMETHYL-PROPENE

Donald G. Kundiger and Joe G. Peterson, Manhattan, Kans., assignors to The Dow Chemical Company, Midland, Mich., a corporation of Delaware No Drawing. Application September 3, 1953, Serial No. 378,397

2 Claims. (Cl. 260—654)

This invention is directed to 1,1,3-tribromo-2-methylpropene and to a method for the preparation thereof.

According to the present invention it has been discovered that 1,1,1-tribromo-2-methyl-2-propanol hemihydrate, having the formula

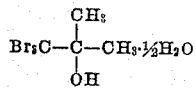

reacts with thionyl chloride to produce 1,1,3-tribromo-2-methylpropene having the formula

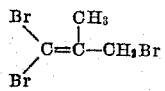

The latter compound is a liquid at room temperature, substantially insoluble in water and soluble in many organic solvents. It has been found to be useful as an intermediate for the production of other chemicals and as an active toxicant for the control of nematodes and fungus spores. The new propene compound has further been found to be an active lachrymatory agent and has utility as a warning agent as, for example, in relatively odorless, toxic fumigants such as methyl bromide.

In carrying out the method of the invention, one molecular proportion of the hemihydrate of 1,1,1-tribromo-2-methyl-2-propanol is mixed with at least one molecular proportion of thionyl chloride and heated for a period of time at a reaction temperature. The reaction proceeds with the evolution of sulfur dioxide and hydrogen chloride. Upon completion of the reaction the crude product is contacted with water to decompose any excess unreacted thionyl chloride and the desired 1,1,3-tribromo-2-methylpropene is recovered by conventional procedure such as extraction, layer separation and fractional distillation.

The temperature of the reaction is not particularly critical provided that the reactants are heated to a temperature sufficient to initiate and maintain the reaction and provided excessive temperatures leading to the formation of undesirable tarry by-products are avoided. In practice, good results have been obtained when carrying out the process at temperatures of from about 90° to 100° C. and under reflux.

Any suitable proportions of the reactants may be employed. However, for obtaining maximum yields, it is preferred to employ at least one mole of thionyl chloride per mole of 1,1,1-tribromo-2-methyl-2-propanol in the reaction and it is sometimes desirable to employ a considerable molecular excess of the thionyl chloride reactant.

The thionyl chloride reactant is employed in a relatively pure state, particularly as regards freedom from metallic chloride contaminants such as ferric chloride and aluminum chloride which may catalyze the formation of undesired by-products. The 1,1,1-tribromo-2-methyl-2-propanol is employed in the hemihydrated form.

In a representative operation, 311 grams (0.97 mole) of the hemihydrate of 1,1,1-tribromo-2-methyl-2-propanol and 150 milliliters (2 moles) of purified thionyl chloride were mixed together in a reaction vessel vented through a water-cooled reflux condenser, and heated on a steam bath for 40 hours. The reaction mixture was then poured into 500 milliliters of water with stirring. The resulting mixture separated into an aqueous layer and an oily organic layer. The latter was separated and fractionally distilled to obtain a 1,1,3-tribromo-2-methylpropene product boiling at 101°–102.5° C. under 18 millimeters pressure and having a refractive index ($n$/D) of 1.547 at 20° C.

The 1,1,3-tribromo-2-methylpropene compound was dispersed in water with a non-ionic emulsifying agent to form a series of dilute aqueous dispersions. Such dispersions containing the substituted propene compound at a concentration of 33 parts per million were found to prevent the germination of 50 to 100 percent of the spores of *Alternaria solani* (tomato early bright) and *Sclerotinia cinerea* (fruit rot fungus).

We claim:

1. The method of producing 1,1,3-tribromo-2-methylpropene which consists in reacting the hemihydrate of 1,1,1-tribromo-2-methyl-2-propanol with thionyl chloride.

2. A method according to claim 1 wherein the thionyl chloride is employed in the amount of at least one mole per mole of 1,1,1-tribromo-2-methyl-2-propanol in the reaction.

References Cited in the file of this patent

Beilstein: "Handbuch der organischen Chemie," vol. 1, page 209 (1918), vol. 1, first sup., page 86 (1928); vol. 1, second sup. pages 181–2 (1944).

Huntress: "Organic Chlorine Compounds," pp. 530–1 (1948).